(12) United States Patent
Miles, Jr.

(10) Patent No.: US 7,275,700 B2
(45) Date of Patent: Oct. 2, 2007

(54) SELF-PROPELLED CHEMICAL DELIVERY VEHICLE AND DISPENSER

(76) Inventor: D. Wayne Miles, Jr., 565 S. Main St., Sparta, NC (US) 28675

(\*) Notice: Subject to any disclaimer, the term of this patent is extended or adjusted under 35 U.S.C. 154(b) by 552 days.

(21) Appl. No.: 10/895,723

(22) Filed: Jul. 21, 2004

(65) Prior Publication Data

US 2006/0016907 A1    Jan. 26, 2006

(51) Int. Cl.
*A01C 19/00* (2006.01)

(52) U.S. Cl. .................... 239/672; 239/172; 239/289; 239/650; 239/661; 239/663; 222/610

(58) Field of Classification Search .............. 239/146, 239/172, 175, 289, 302, 379, 650, 661, 666, 239/668, 672, 675, 663; 222/608, 610; 280/288.4
See application file for complete search history.

(56) References Cited

U.S. PATENT DOCUMENTS

| | | | | |
|---|---|---|---|---|
| 3,994,437 | A * | 11/1976 | Kitterman | 239/172 |
| 4,911,339 | A * | 3/1990 | Cushing | 222/610 |
| 5,595,262 | A * | 1/1997 | Martin | 280/288.4 |
| 6,722,679 | B2 * | 4/2004 | Englert | 222/610 |
| 6,805,304 | B1 * | 10/2004 | Nokes et al. | 239/146 |

\* cited by examiner

*Primary Examiner*—Steven J. Ganey
(74) *Attorney, Agent, or Firm*—David J. Clement; Stoll Keenon Ogden PLLC (57) ABSTRACT

A self-propelled chemical delivery vehicle and dispenser generally for agricultural use includes a frame including first and second vertically spaced support members; a rider support member mounted to the frame; an apparatus for providing motive power mounted to the frame; at least two wheel and tire assemblies, with one of the at least two wheels being a drive wheel, the drive wheel being in communication with the apparatus for providing motive power for application of motive power through the ground contact for vehicle movement with the at least two wheel and tire assemblies being spaced apart in generally longitudinal alignment; and an assembly for directional control of the self-propelled chemical delivery vehicle and dispenser mounted to the frame. Also included is a chemical reservoir mounted to the frame intermediate the first and second vertically spaced support members and intermediate the at least two wheel and tire assemblies; and a chemical delivery assembly mounted to the frame in communication with the chemical reservoir for selective, operator controlled chemical distribution therefrom. In addition, the chemical reservoir is mounted to the frame coincident with the center of gravity of the two-wheeled chemical delivery vehicle and dispenser.

18 Claims, 7 Drawing Sheets

SELF-PROPELLED CHEMICAL DELIVERY VEHICLE AND DISPENSER

BACKGROUND OF THE INVENTION

The present invention is related broadly to vehicles used for farm or other agricultural use and, more particularly, to a two-wheeled self-propelled agricultural chemical delivery vehicle and dispenser.

Most agricultural operations treat crops with chemicals that may include pesticides, nutrients or fertilizer. The present application with refer to all such applications as "chemical" whether or not they are organic or synthetic. Currently, chemical spreaders are used that may be towed by tractors or carried by hand. Such broadcast spreaders distribute the chemicals over a wide an area as possible given the size of the distribution implement. The choice of distribution implement typically depends on the crop being treated.

For example, tobacco in the early stages of development may be treated by a distribution hopper towed by tractor that passes over the crops. Alternately, crop dusting aircraft may be employed to achieve an even wider distribution range. On the other hand, for small areas and crops for which application is difficult, hand spreaders may be employed.

Crops are typically raised in organized rows and, some crops such as Christmas trees may be arranged in rows that extend both linearly and laterally away from a common point. In the case of Christmas trees, chemical treatments are typically applied by hand using some handheld or carried implement. Certain disadvantages exist with the handheld application of chemicals. First, exposure to the chemicals by the distributor may not be healthy in all cases. Further, the application process is slower than would occur if a powered vehicle were employed. The process may also be wasteful as well as ineffective in some areas since the chemicals may be distributed at an uneven rate due to hand controls associated with the spreaders. Finally, as seen from the foregoing, the process of manually applying chemical treatments to crops such as Christmas trees can be enhanced by the use of a chemical delivery vehicle.

It is known to provide three or four wheeled all-terrain vehicles with towed chemical distribution implements which amounts to nothing more than a reduced sized tractor and hopper arrangement. Another alternative is to carry a tank or canister on the back of a three or four wheeled all-terrain vehicle for distribution.

A disadvantage with the three and four wheeled all-terrain vehicles is that their width dictates that there be a unnecessarily wide gap between the trees, thereby reducing the effective acre yield of the farm. With a sufficiently narrow path, the trees would be hit by the passing vehicle, possibly causing damage and crop loss. Accordingly, there exists a need for a narrow vehicle that can safely and effectively carry bulk chemicals for distribution in an efficient and rapid manner.

SUMMARY OF THE INVENTION

It is accordingly an object of the present invention to provide a two-wheeled self-propelled chemical delivery vehicle and dispenser that can fit between standard crop spacing, especially tree spacing within a tree farm for chemical distribution to the trees.

It is another object of the present invention to provide such a self-propelled chemical delivery vehicle and dispenser that can carry a bulk chemical in a safe and balanced manner.

It is another object of the present invention to provide such a self-propelled chemical delivery vehicle and dispenser that carries the bulk chemical between upper and lower frame rails and intermediate the two wheels of the vehicle to thereby maintain the center of gravity at a position that enhances the controllability of the vehicle.

It is accordingly an object of the present invention to provide a self-propelled chemical delivery vehicle and dispenser generally for agricultural use including:

a) a frame including first and second vertically spaced support members;
b) a rider support member mounted to the frame;
c) an apparatus for providing motive power mounted to the frame;
d) at least two wheels rotatably mounted to the frame with each the wheel having a tire mounted thereto for ground contact, thereby forming a plurality of wheel and tire assemblies, one of the at least two wheels being a drive wheel, the drive wheel being in communication with the apparatus for providing motive power for application of motive power through the ground contact for vehicle movement, with the at least two wheel and tire assemblies being spaced apart in generally longitudinal alignment;
e) an assembly for directional control of the self-propelled chemical delivery vehicle and dispenser mounted to the frame;
f) a chemical reservoir mounted to the frame intermediate the first and second is vertically spaced support members, and intermediate the at least two wheel and tire assemblies; and
g) a chemical delivery assembly mounted to the frame in communication with the chemical reservoir for selective, operator controlled chemical distribution therefrom.

It is preferred that the chemical reservoir is mounted to the frame coincident with the center of gravity of the two-wheeled chemical delivery vehicle.

Preferably, the chemical delivery assembly includes a selectively controllable gate and a delivery chute.

The present invention may further include a chemical distribution control assembly for controlling chemical output from the delivery assembly. It is preferred that the chemical distribution control assembly is configured for operational communication with the gate for selectively releasing chemicals to the chute for discharge. Preferably, the chute includes a director plate mounted to the frame to direct chemicals being dispensed away from the self-propelled chemical delivery vehicle and dispenser. Further, the chute may be configured and mounted to the frame to direct chemical discharge generally laterally away from the self-propelled chemical delivery vehicle and dispenser.

It is preferential that the chemical reservoir is formed as a hopper. Accordingly, the delivery assembly preferably includes a motorized auger disposed within the hopper for movement of chemicals within the hopper to the gate for distribution.

The present invention may be configured to carry liquid or solid, particulate forms of chemicals. Accordingly, the distribution assemblies vary in structure according to the task.

It is preferred that the reservoir includes a liquid-supporting vessel. Preferably, the delivery assembly includes a pump in fluid communication with the vessel for delivery of liquid chemicals. Further, the delivery assembly may include at least one nozzle directed away from the dispenser, the nozzle being in fluid communication with the pump.

The present invention preferably further includes a chemical distribution control assembly for controlling chemical output from the delivery assembly. It is preferred that the chemical distribution control assembly is configured for operational communication with the gate for selectively releasing chemicals to the at least one nozzle for discharge.

Each preferred embodiment of the present invention can be explained in greater detail as follows. A dry-chemical delivery vehicle and dispenser may take the form of a self-propelled chemical delivery vehicle and dispenser generally for agricultural use includes:
  a) a frame including first and second vertically spaced support members;
  b) a rider support member mounted to the frame;
  c) an apparatus for providing motive power mounted to the frame;
  d) at least two wheels rotatably mounted to the frame with each the wheel having a tire mounted thereto for ground contact, thereby forming a plurality of wheel and tire assemblies, one of the at least two wheels being a drive wheel, the drive wheel being in communication with the apparatus for providing motive power for application of motive power through the ground contact for vehicle movement with the at least two wheel and tire assemblies being spaced apart in generally longitudinal alignment;
  e) an assembly for directional control of the self-propelled chemical delivery vehicle and dispenser mounted to the frame;
  f) a chemical reservoir formed as a hopper mounted to the frame intermediate the first and second vertically spaced support members and intermediate the at least two wheel and tire assemblies;
  g) a chemical delivery assembly including a selectively controllable gate and a delivery chute mounted to the frame in communication with the chemical reservoir and a motorized auger disposed within the hopper for movement of chemicals within the hopper to the gate for selective, operator controlled chemical distribution therefrom; and
  h) a chemical distribution control assembly for controlling chemical output from the delivery assembly, the chemical distribution control assembly being in operational communication with the gate for selectively releasing chemicals to the chute for discharge.

It is preferred that the chute includes a director plate mounted to the frame to direct chemicals being dispensed away from the chemical delivery vehicle and dispenser. It is further preferred that the chute is configured and mounted to the frame to direct chemical discharge generally laterally away from the self-propelled chemical delivery vehicle and dispenser.

A preferred embodiment of the present invention for dispensing liquid chemicals may be described as a self-propelled chemical delivery vehicle and dispenser generally for agricultural use comprising:
  a) a frame including first and second vertically spaced support members;
  b) a rider support member mounted to the frame;
  c) an apparatus for providing motive power mounted to the frame;
  d) at least two wheels rotatably mounted to the frame with each the wheel having a tire mounted thereto for ground contact, thereby forming a plurality of wheel and tire assemblies, one of the at least two wheels being a drive wheel, the drive wheel being in communication with the apparatus for providing motive power for application of motive power through the ground contact for vehicle movement with the at least two wheel and tire assemblies being spaced apart in generally longitudinal alignment;
  e) an assembly for directional control of the self-propelled chemical delivery vehicle and dispenser mounted to the frame;
  f) a chemical reservoir including a liquid-supporting vessel mounted to the frame intermediate the first and second vertically spaced support members and intermediate the at least two wheel and tire assemblies; and
  g) a chemical delivery assembly including a pump in fluid communication with the liquid-supporting vessel for delivery of liquid chemicals, and including at least one nozzle directed away from the dispenser, the at least one nozzle being in fluid communication with the pump, the chemical delivery assembly being mounted to the frame in communication with the chemical reservoir for selective, operator controlled chemical distribution therefrom; and
  h) a chemical distribution control assembly for controlling chemical output from the delivery assembly, the chemical distribution control assembly being configured for operational communication with the pump for selectively releasing chemicals to the at least one nozzle for discharge.

It is preferred that the at least one nozzle is configured and mounted to the frame to direct chemical discharge generally laterally away from the self-propelled chemical delivery vehicle and dispenser.

Another preferred embodiment of the present invention for dispensing liquid chemicals may be described as a self-propelled chemical delivery vehicle and dispenser generally for agricultural use including:
  a) a frame including first and second vertically spaced support members;
  b) a rider support member mounted to the frame;
  c) an apparatus for providing motive power mounted to the frame;
  d) at least two wheels rotatably mounted to the frame with each the wheel having a tire mounted thereto for ground contact, thereby forming a plurality of wheel and tire assemblies, one of the at least two wheels being a drive wheel, the drive wheel being in communication with the apparatus for providing motive power for application of motive power through the ground contact for vehicle movement with the at least two wheel and tire assemblies being spaced apart in generally longitudinal alignment;
  e) an assembly for directional control of the a two-wheeled chemical delivery vehicle mounted to the frame; and
  f) a chemical holding and dispensing assembly including:
    (i) a chemical reservoir mounted to the frame coincident with the center of gravity of the two-wheeled chemical delivery vehicle; and
    (ii) a chemical delivery assembly mounted to the frame in communication with the chemical reservoir for selective, operator controlled chemical distribution therefrom.

By the above, the present invention provides a simple and effective implement for distributing agricultural chemicals between rows of trees or other crops.

DESCRIPTION OF THE PREFERRED EMBODIMENT

Figure 1:
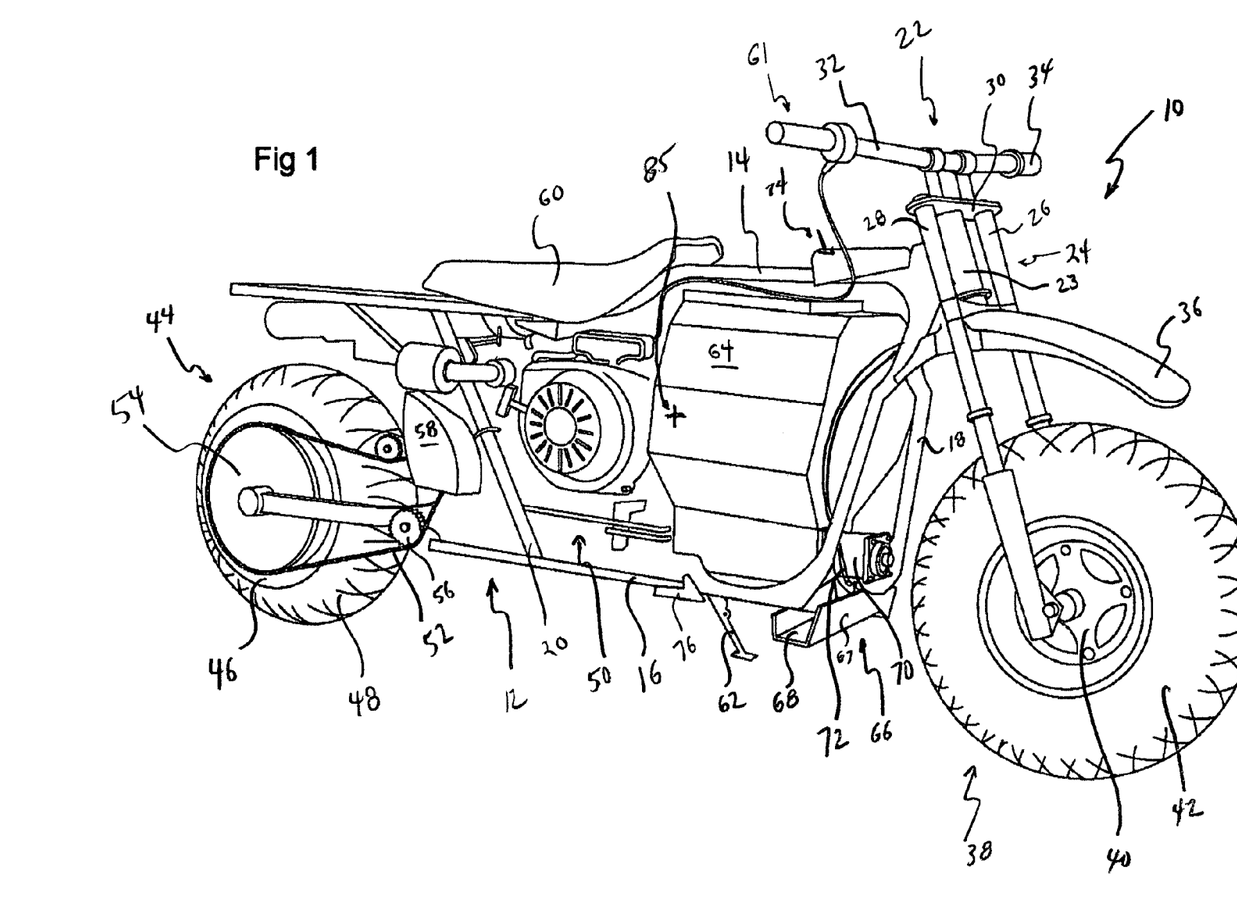
FIG. 1 is a perspective view of a self-propelled chemical delivery vehicle and dispenser according to one preferred embodiment of the present invention.

Turning now to the drawings and, more particularly, to FIG. 1, a self-propelled chemical delivery vehicle and dispenser is illustrated generally at 10 and includes a skeletal frame 12 formed from a series of steel tubes including a first support member 14 spaced vertically from a second support member 16 and connected using a front vertical support member 18 horizontally spaced from a rear vertical support member 20. The overall frame structure is similar to that of a motorcycle. A direction control assembly 22 is provided to allow a rider to steer the chemical delivery and dispensing vehicle 10. To that end, a head tube 23 is fitting to the junction of the first horizontal support member 14 and the front vertical support member 18. It should be noted that there are more than one horizontal and vertical spaced support members that extend parallel to one another to form the frame structure as seen in the drawings. A fork 24 is fitted to the head tube 23 for pivoting movement thereabout. First and second fork members 26, 28 project outwardly at a parallel manner to form the fork 24. The first and the second fork members 26, 28 are attached to a control plate 30 that allows the assembly move as a unit. A handlebar arrangement 32 is attached to the control plate 30 so that the rider may steer the chemical delivery and dispensing vehicle. Handgrips 34 are provided to enhance the rider's ability to control the vehicle. Optionally, fender 36 may be placed intermediate the parallelly extending fork members 26, 28.

Figure 6:
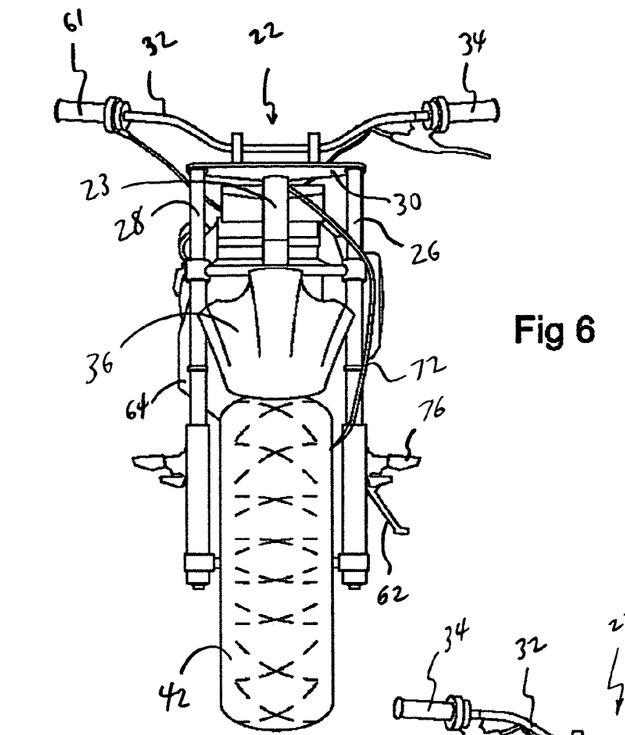
FIG. 6 is a front view of the self-propelled chemical delivery vehicle and dispenser illustrated in FIG. 1
Figure 7:
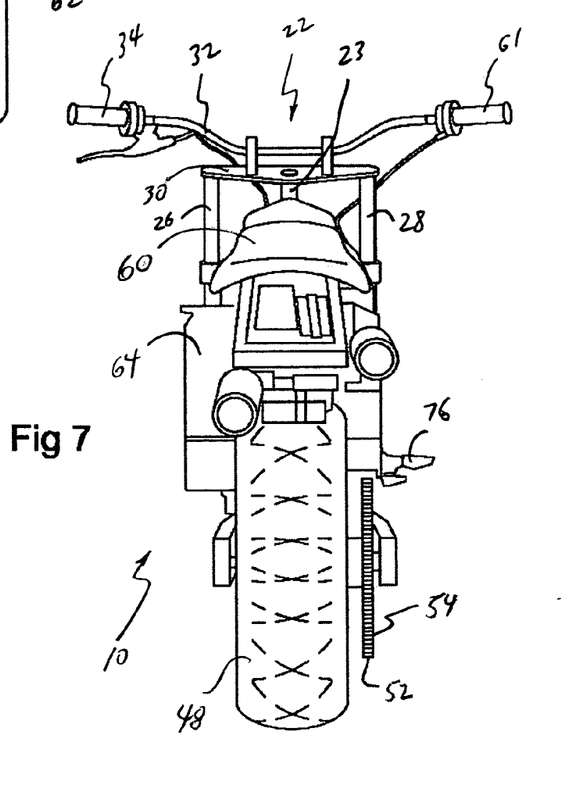
FIG. 7 is a rear view of the self-propelled chemical delivery vehicle and dispenser illustrated in FIG. 1.

Ground support and power application is provided through two horizontally-spaced, linearly-aligned tire assemblies 38. As seen in FIGS. 1, 6 and 7 the wheel and tire assemblies are essentially conventional and include a pneumatic tire 42 fitted to a steel, aluminum or other metal wheel 40 for rotational movement about an axle. A similar structure is provided in the rear with the rear tire 48 fitted to a rear wheel 46 forming a rear wheel and tire assembly 44. As is conventional with motorcycles, the rear wheel and tire assembly 44 provides a structure for application of motive power through ground contact while the front wheel and tire assembly 38 provides ground support and steering.

Figure 2:
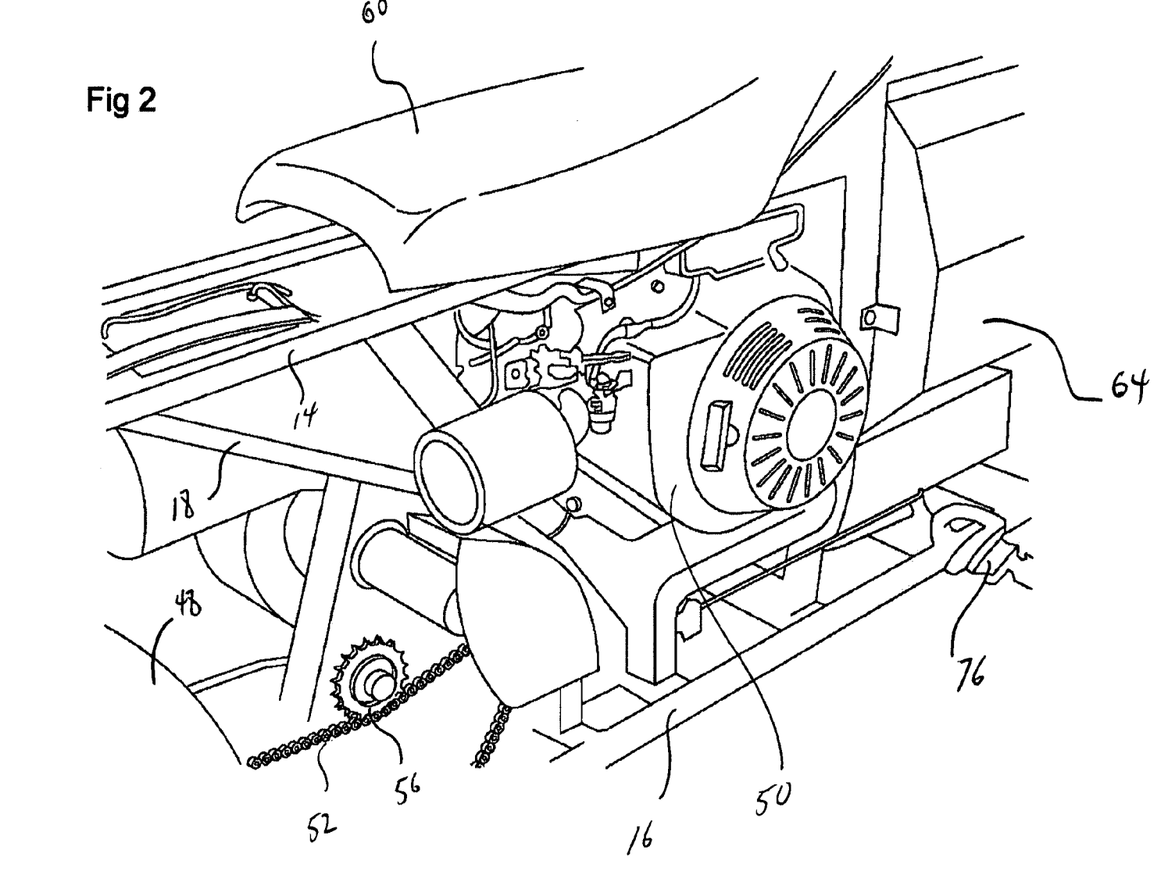
FIG. 2 is a perspective view of the self-propelled chemical delivery vehicle and dispenser illustrated in FIG. 1.
Figure 3:
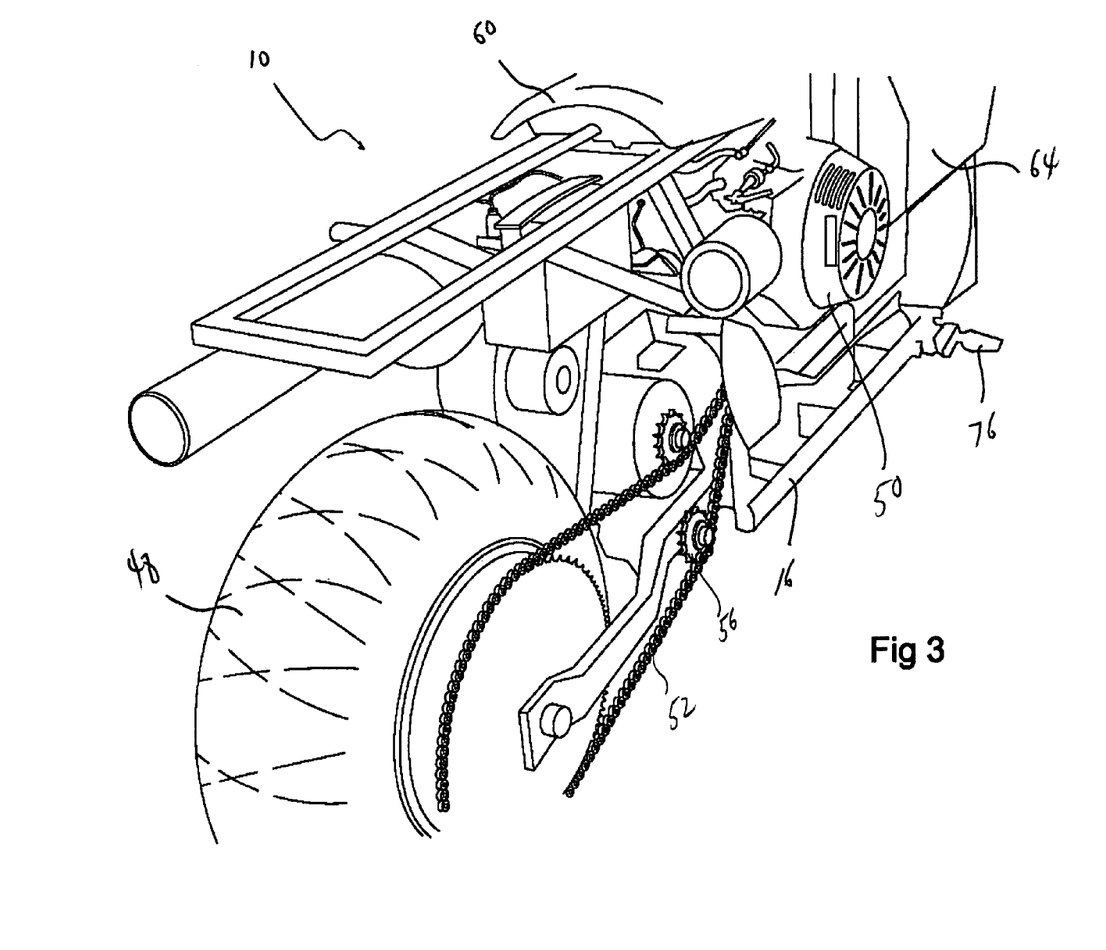
FIG. 3 is a side view of the self-propelled chemical delivery vehicle and dispenser illustrated in FIG. 1.

In order to propel the vehicle, an engine 50 is provided as seen in FIGS. 1, 2 and 3. The engine 50 may be a 2-cycle or 4-cycle engine and may be of the type generally associated with lawnmowers and go-carts, the type generally associated with chainsaws, or the type generally associated with motorcycles. The type of engine is not key to the present invention but should be chosen with the terrain and role of the chemical delivery and dispensing vehicle in mind. In the case where Christmas trees are grown in the mountains, a 4-cycle engine with substantial torque would likely be the engine of choice. While powerful, a motorcycle engine may be too expensive and too sophisticated to effectively fulfill the roll of power plant for the chemical delivery and dispensing vehicle of the present invention.

In order to transmit the power to the rear wheel for vehicle movement, a sprocket 54 is rotatably attached to the axle holding the rear wheel and tire assembly 44. A drive chain 52 extends from the engine to the sprocket. The rider is protected from the chain by a chain guard 58.

Rider support is provided by a seat 60 mounted to an upper support member 14 and footpegs 76 mounted to a lower support member 18. A kickstand 62 is provided to maintain the chemical delivery and dispensing vehicle 10 in an upright position when not in use.

The human-machine interface that allows a rider to control the vehicle includes not only the seat 60, the foot pedal 76 and the handlebar 32, a throttle is provided in the manner of a conventional motorcycle which includes a twist grip illustrated at 61 in FIGS. 1, 6, and 7. Although not illustrated in FIG. 1, a handbrake 63 is provided on the side of the handlebar 32 opposite from the throttle 61. These control structures are conventional to motorcycles and mini-bikes and therefore, a rider who is sufficiently skilled to operate a motorcycle or mini-bike should have a minimal learning curve when approaching the chemical delivery and dispensing vehicle 10 of the present invention.

The foregoing description renders the chemical delivery and dispensing vehicle somewhat like a conventional motorcycle or mini-bike. Nevertheless, the vehicle is substantially different in that the frame is extended and accommodates a chemical reservoir 64 as will be disclosed in greater detail hereinafter. Further, the tires 42 tend to be oversized to support the weight of the chemical payload.

Figure 8:
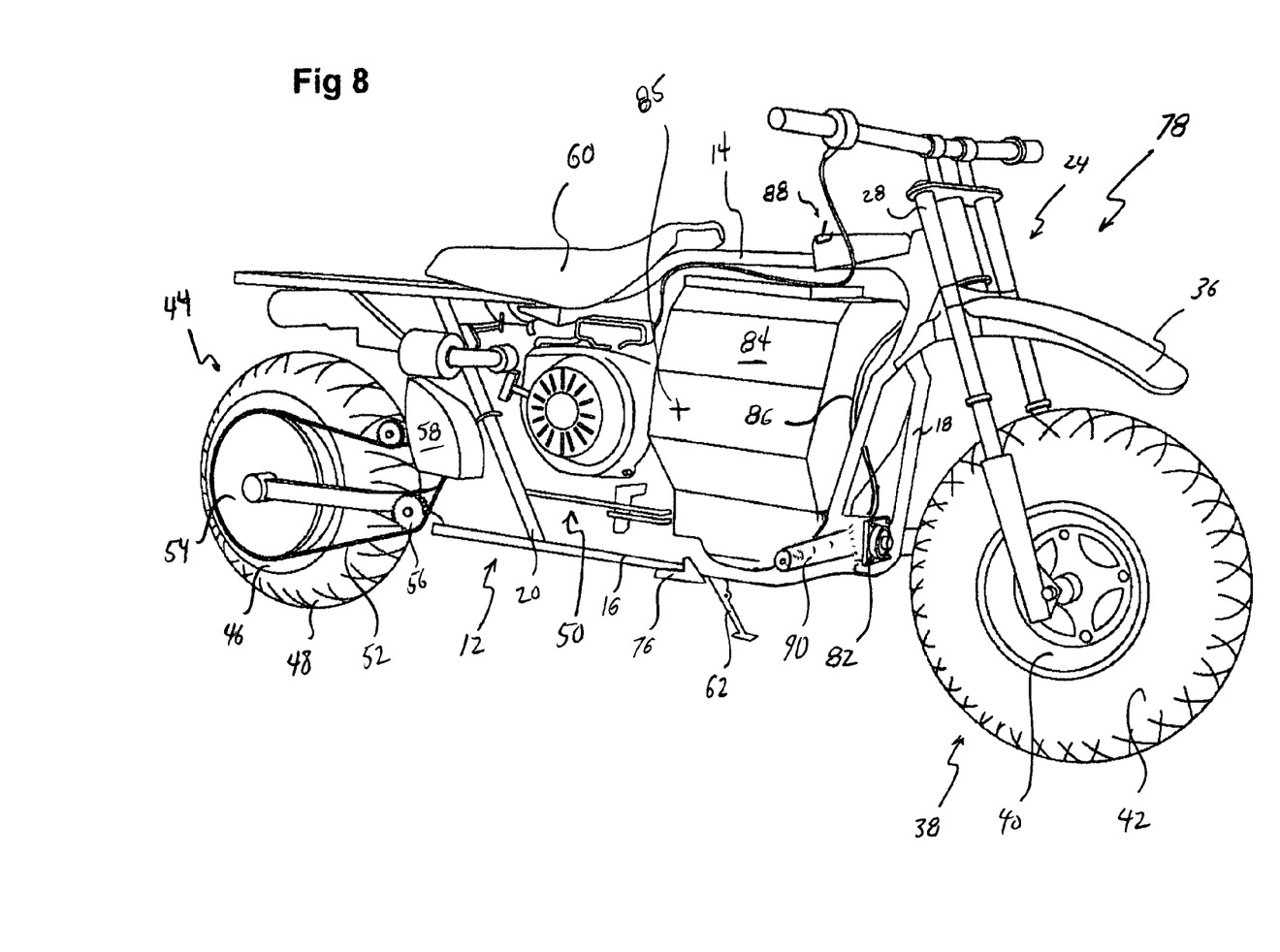
FIG. 8 is a perspective view of a self-propelled chemical delivery vehicle and dispenser according to a second preferred embodiment of the present invention.

In order to provide the chemical delivery and dispensing vehicle with sufficient stability for sustained dispensing operations under a variety of operating conditions, the present invention includes a chemical reservoir 64 disposed within the framework of the delivery vehicle 10, and coincident with the center of gravity, illustrated at 85 in FIGS. 1 and 8, of the delivery vehicle 10. It is contemplated that the chemical reservoir 64 be removable and replaceable, and it is conceivable that the chemical delivery and dispensing vehicle be sold apart from the reservoir, to allow the customization of the vehicle through a choice of reservoirs.

The chemical reservoir 64 is illustrated as an multi-faceted tank fitted between the vertically extending support members 18, 20 and, accordingly, between the wheel and tire assemblies 38, 44. Further, the chemical reservoir 64 is disposed intermediate the first and second vertically spaced support members 14, 16. In this manner, the chemical reservoir 64 is placed coincident with the center of gravity 85 of the delivery and dispensing vehicle so as to control the center of gravity of this dispenser and provide minimum movement of the center of gravity as the reservoir 64 is emptied. Positioning of the chemical reservoir 64 as discussed herein allows the rider/operator an enhanced measure of control over the direction and displacement of the chemical delivery and dispensing vehicle 10.

The chemical delivery and dispensing vehicle of the present invention may be configured for dispensing liquid or dry chemicals. Further, while the present invention is illustrated in FIG. 1 as configured for dispensing dry chemicals and in FIG. 8 for dispensing liquid chemicals, it is contemplated that one vehicle may be equipped with interchangeable components such that liquid or dry chemicals may be dispensed from a single chemical delivery and dispensing vehicle 10.

Figure 4:
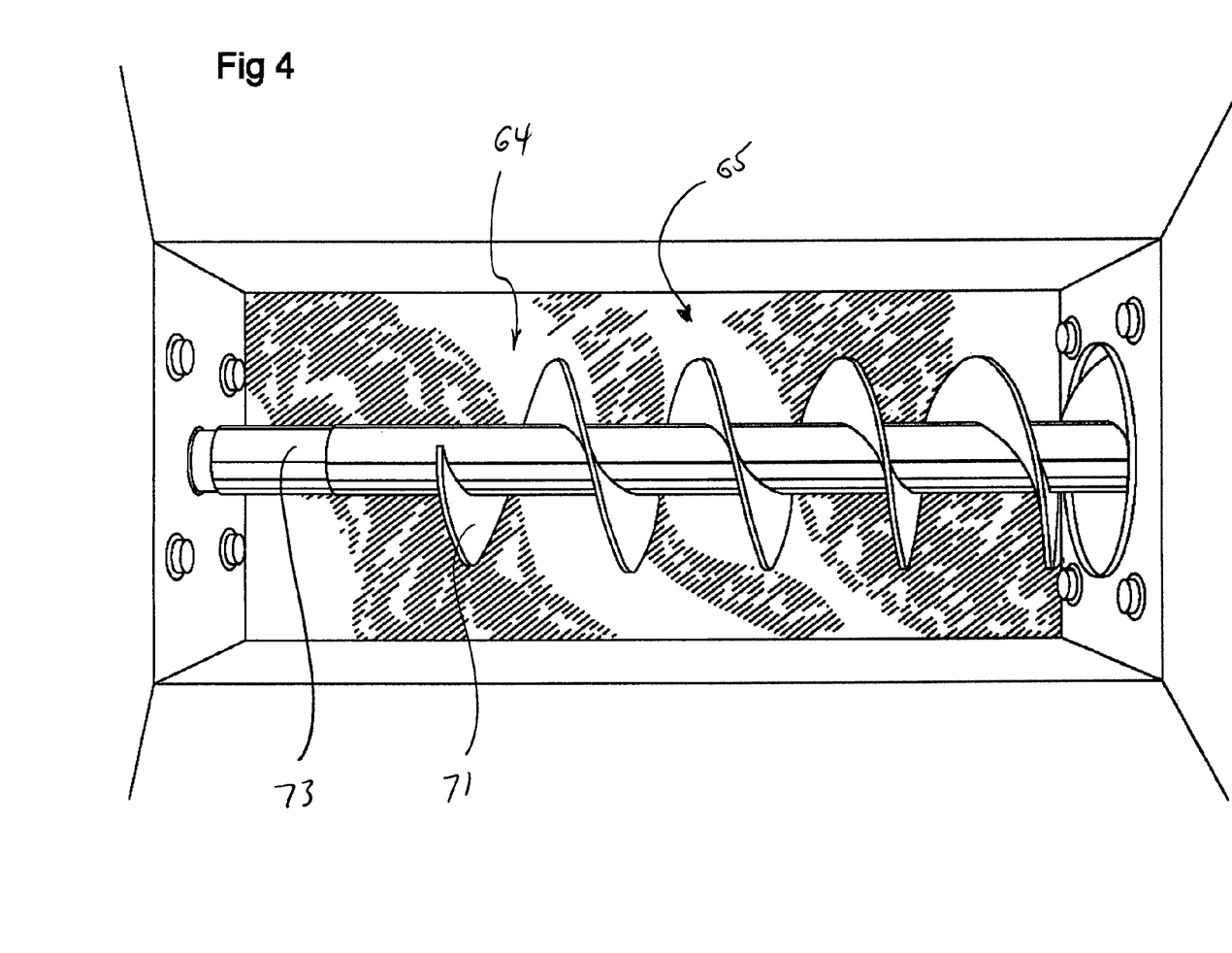
FIG. 4 is an interior view of the hopper of the present invention.
Figure 5:
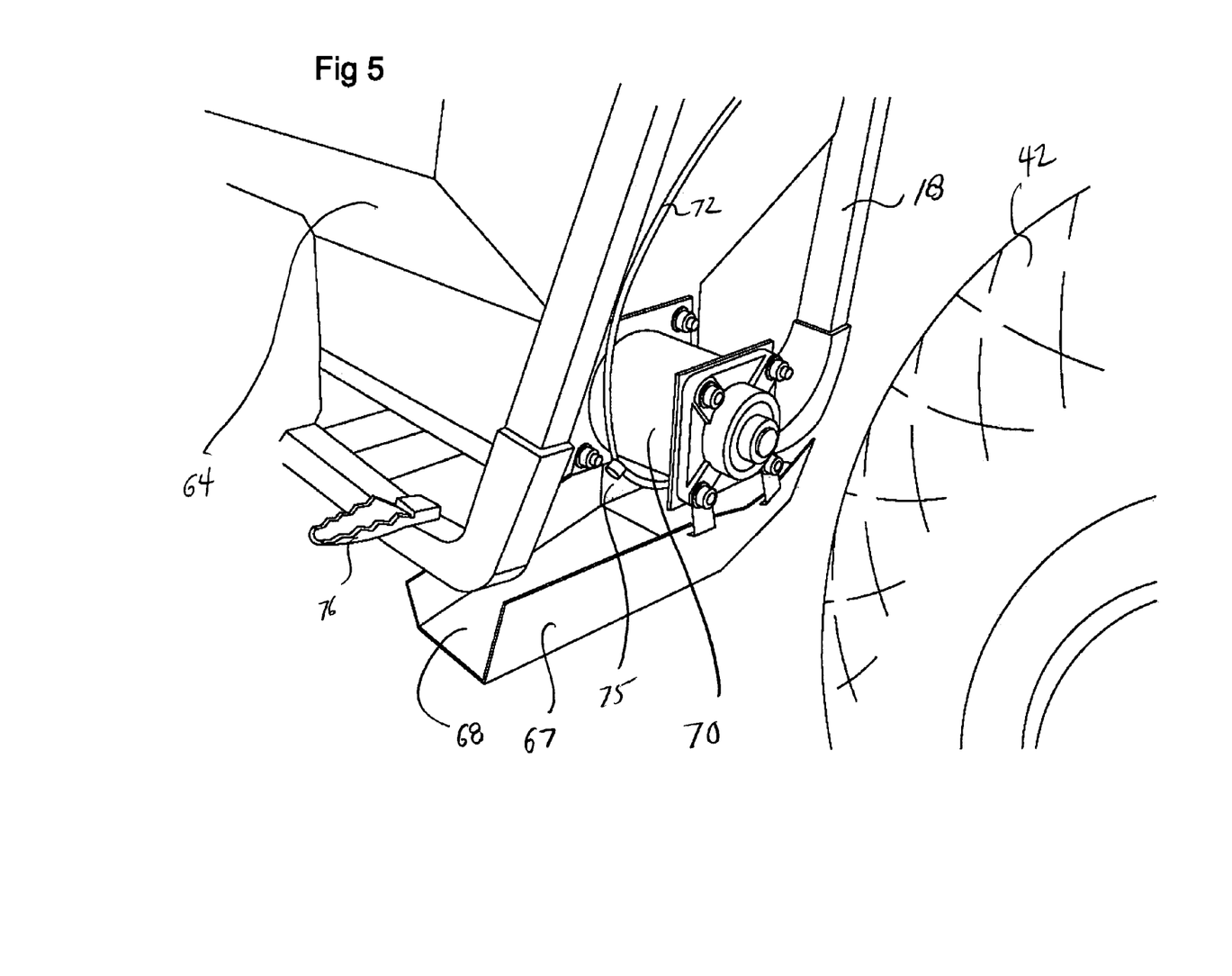
FIG. 5 is a view of the chemical distribution assembly according to one preferred embodiment of the present invention.

With reference to FIG. 4, a chemical delivery vehicle and dispenser configured for dry chemicals is illustrated with the reservoir 64 in the form of a hopper having generally slanted wall members that direct dry chemical particulate matter into a lower basin 65 formed in the reservoir 64. A helical screw is rotatably mounted within the basin 65 in order to pull or drive the chemical particulate matter out of the reservoir and into a chemical delivery arrangement that will be described in greater detail hereinafter. The helical screw includes a shaft 73 with a continuous thread structure formed by a drive plate 71 extending helically along the shaft. By rotating the shaft 73, the drive plate 71 acts to move chemical material through the basin 65 and outwardly through a gate or opening at the base of the screw. The auger or screw is driven by a drive motor 70 that is selectively controllable for dispensing chemicals. The chemical outlet opening or gate is formed in the basin 65 walls underneath the drive motor 70. A chute 68 is provided to direct the chemicals laterally outwardly from the sides of the chemical delivery and dispensing vehicle 10. The chute 68 is formed as a generally unshaped member having a director plate 67 disposed oppositely from the chemical outlet 75 so that chemicals exiting the outlet will collide with the director plate 67 and be ejected from the chute 68 on either side of the chemical delivery and dispensing vehicle 10. The foregoing discussion describes the chemical distribution assembly 66. The present invention also includes a control assembly for activating and deactivating the auger drive motor 70 including a control cable 72 and a switch 74 disposed within easy reach of the rider.

Turning now to FIG. 8, a version of the chemical delivery and dispensing vehicle is illustrated generally at 78 and is configured for dispensing liquid chemicals. The liquid chemical version includes a reservoir 84 that may or may not be configured like the reservoir 64 of the dry chemical delivery vehicle and dispenser 10. Further, it is contemplated that the entire reservoir and chemical distribution assemblies may be interchangeable. One reservoir may be in use while the other reservoir may be being prepared for installation into the frame 12 of the chemical delivery and dispensing vehicle 10, 78.

With continued reference to FIG. 8, it may be appreciated that the reservoir 84 will be filled with liquid and a pump 82 is provided at the base for moving liquid out of the reservoir 84. Nozzles 90 project laterally away from the pump and are configured for spraying liquid chemicals laterally away from a moving dispensing vehicle 78. The pump control is provided through a control cable 86 and a switch 88 that is disposed within reach of a rider on the seat 60.

In operation, an operator, or rider will be required to maneuver the vehicle between rows of vegetation dispensing chemicals from either side of the chemical delivery vehicle and dispenser 10. Typically, the vegetation will consist of Christmas trees and the remainder of the discussion will focus on Christmas trees although it should be understood that the present invention is capable of spreading various liquid and solid material in many situations.

It should initially be determined whether a solid or liquid chemical will be dispensed and that will determine which hopper 64, 84 will be used. If solid particulate matter is used for dispensing, the chemical delivery vehicle and dispenser 10 of FIG. 1 will be utilized. A rider 60 will start the engine 50 using the pull cord in a manner that is generally known and throttle the engine with the handlebar mounted throttle 61. The rider mounts the chemical delivery vehicle and dispenser 10 in the manner of a motorcycle and sits on the seat 60 while straddling the frame 12. Since the chemical load is disposed within the framework 10 and substantially coincident with the center of gravity of the dispenser 10, a rider can maneuver the dispenser easily without fear of turning over. Many Christmas trees are grown on mountainous terrain such that there is a genuine danger of turning over backward in a vehicle with an artificially induced high center of gravity such as an ATV with a tank mounted high in the rear. By locating the center of gravity of the present invention within the framework and forwardly of the engine and driver substantially enhanced handling and safety is achieved.

Once the rider starts down rows of vegetation, the gate may be open and the auger 73 illustrated in FIG. 4 caused to turn and thereby drive the particulate matter forwardly through the gate and into the dispensing chute where it is ejected outwardly from either side of the vehicle into the vegetation. The rider's feet should be on the foot peg 76 safely out of the way of the dispensed chemical. As the rider arrives at the end of the row, the gate may be shut and dispensing halted until the rider can realign the chemical delivery vehicle and dispenser 10 and travel down another row dispensing more chemicals.

Operation of the vehicle in a liquid dispensing mode is essentially the same as previously described with respect to the particulate dispensing mode. Nevertheless, the chemical delivery vehicle and dispenser 10 should be fitted with the chemical storage reservoir 84 with laterally extending nozzles 90 which achieves the configuration of the dispenser illustrated at 78 in FIG. 8. This version of the chemical delivery vehicle and dispenser 78 is operated in substantially the same manner as the previously-discussed dispenser with the rider directing the chemical delivery vehicle and dispenser 78 between rows of vegetation and liquid chemicals spraying from the nozzles laterally away from both sides of the chemical delivery vehicle and dispenser 78. The rows of vegetation will typically be close enough together so that there is no substantial chemical loss due to blowback caused by movement of the self-propelled chemical delivery vehicle and dispenser 78. This should also hold true for the particulate version of the chemical delivery vehicle and dispenser 10. Once the dispensing operations have ended, the chemical hoppers or tanks may be dismounted for cleaning, refilling or both.

One of the substantial advantages of the present invention is that maintenance of the chemical delivery vehicle and dispenser 10 is substantially similar to that of a lawnmower or motorcycle due to the commonality of components.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. A self-propelled chemical delivery vehicle and dispenser generally for agricultural use comprising:
   a) a frame including first and second vertically spaced support members;
   b) a rider support member mounted to said frame;
   c) an apparatus for providing motive power mounted to said frame;
   d) at least two wheels rotatably mounted to said frame with each said wheel having a tire mounted thereto for ground contact, thereby forming a plurality of wheel and tire assemblies, one of said at least two wheels being a drive wheel, said drive wheel being in communication with said apparatus for providing motive power for application of motive power through said ground contact for vehicle movement with the at least two wheel and tire assemblies being spaced apart in generally longitudinal alignment;
   e) an assembly for directional control of said self-propelled chemical delivery vehicle and dispenser mounted to said frame;
   f) a chemical reservoir mounted to said frame, intermediate said first and second vertically spaced support members, and intermediate said at least two wheel and tire assemblies; and,
   g) a chemical delivery assembly, including a selectively controllable gate and a delivery chute, mounted to said frame in communication with said chemical reservoir for selective, operator controlled chemical distribution therefrom.

2. A self propelled chemical delivery vehicle and dispenser according to claim 1 wherein said chemical reservoir is mounted to said frame coincident with the center of gravity of said at least two-wheeled chemical delivery vehicle.

3. A self-propelled chemical delivery vehicle and dispenser according to claim 1 and further comprising a chemical distribution control assembly for controlling chemical output from said delivery assembly.

4. A self-propelled chemical delivery vehicle and dispenser according to claim 3 wherein said chemical distribution control assembly is configured for operational communication with said gate for selectively releasing chemicals to said chute for discharge.

5. A self-propelled chemical delivery vehicle and dispenser according to claim 1 wherein said chute includes a director plate mounted to said frame to direct chemicals being dispensed away from said self-propelled chemical delivery vehicle and dispenser.

6. A self propelled chemical delivery vehicle and dispenser according to claim 5 wherein said chute is configured and mounted to said frame to direct chemical discharge generally laterally away from said self-propelled chemical delivery vehicle and dispenser.

7. A self-propelled chemical delivery vehicle and dispenser according to claim 1 wherein said chemical reservoir is formed as a hopper.

8. A self-propelled chemical delivery vehicle and dispenser according to claim 7 wherein said delivery assembly includes a motorized auger disposed within said hopper for movement of chemicals within said hopper to said gate for distribution.

9. A self-propelled chemical delivery vehicle and dispenser generally for agricultural use comprising:
   a) a frame including first and second vertically spaced support members;
   b) a rider support member mounted to said frame;
   c) an apparatus for providing motive power mounted to said frame;
   d) at least two wheels rotatably mounted to said frame with each said wheel having a tire mounted thereto for ground contact, thereby forming a plurality of wheel and tire assemblies, one of said at least two wheels being a drive wheel, said drive wheel being in communication with said apparatus for providing motive power for application of motive power through said ground contact for vehicle movement with the at least two wheel and tire assemblies being spaced apart in generally longitudinal alignment;
   e) an assembly for directional control of said self-propelled chemical delivery vehicle and dispenser mounted to said frame;
   f) a chemical reservoir formed as a hopper mounted to said frame intermediate said first and second vertically spaced support members and intermediate said at least two wheel and tire assemblies;
   g) a chemical delivery assembly including a selectively controllable gate and a delivery chute mounted to said frame in communication with said chemical reservoir and a motorized auger disposed within said hopper for movement of chemicals within said hopper to said gate for selective, operator controlled chemical distribution therefrom; and
   h) a chemical distribution control assembly for controlling chemical output from said delivery assembly, said chemical distribution control assembly being in operational communication with said gate for selectively releasing chemicals to said chute for discharge.

10. A self-propelled chemical delivery vehicle and dispenser according to claim 9 wherein said chemical reservoir is mounted to said frame coincident with the center of gravity of said at least two-wheeled chemical delivery vehicle without said chemical reservoir.

11. A self-propelled chemical delivery vehicle and dispenser according to claim 9 wherein said chute includes a director plate mounted to said frame to direct chemicals being dispensed away from said chemical delivery vehicle and dispenser.

12. A self-propelled chemical delivery vehicle and dispenser according to claim 9 wherein said chute is configured and mounted to said frame to direct chemical discharge generally laterally away from said self-propelled chemical delivery vehicle and dispenser.

13. A self-propelled chemical delivery vehicle and dispenser generally for agricultural use comprising:
   a) a frame including first and second vertically spaced support members;
   b) a rider support member mounted to said frame;
   c) an anparatus for providing motive power mounted to said frame;
   d) at least two wheels rotatably mounted to said frame with each said wheel having a tire mounted thereto for ground contact, thereby forming a plurality of wheel and tire assemblies, one of said at least two wheels being a drive wheel, said drive wheel being in communication with said apparatus for providing motive power for application of motive power through said ground contact for vehicle movement with the at least two wheel and tire assemblies being spaced apart in generally longitudinal alignment;
   e) an assembly for directional control of said at least two-wheeled chemical delivery vehicle mounted to said frame; and f) a chemical holding and dispensing assembly including:
  (i) a chemical reservoir mounted to said frame coincident with the center of gravity of said at least two-wheeled chemical delivery vehicle; and
  (ii) a chemical delivery assembly, including a selectively controllable gate and a delivery chute, mounted to said frame in communication with said chemical reservoir for selective, operator controlled chemical distribution therefrom.

14. A self-propelled chemical delivery vehicle and dispenser according to claim 13 wherein said chemical distribution control assembly is configured for operational communication with said gate for selectively releasing chemicals to said chute for discharge.

15. A self-propelled chemical delivery vehicle and dispenser according to claim 13 wherein said chute includes a director plate mounted to said frame to direct chemicals being dispensed away from said self-propelled chemical delivery vehicle and dispenser.

16. A self-propelled chemical delivery vehicle and dispenser according to claim 15 wherein said chute is configured and mounted to said frame to direct chemical discharge generally laterally away from said self-propelled chemical delivery vehicle and dispenser.

17. A self-propelled chemical delivery vehicle and dispenser according to claim 13 wherein said chemical reservoir is formed as a hopper.

18. A self-propelled chemical delivery vehicle and dispenser according to claim 17 wherein said delivery assembly includes a motorized auger disposed within said hopper for movement of chemicals within said hopper to said gate for distribution.

* * * * *